(12) United States Patent
Takikawa et al.

(10) Patent No.: US 10,072,728 B2
(45) Date of Patent: Sep. 11, 2018

(54) CENTRIFUGAL-PENDULUM VIBRATION ABSORBING DEVICE

(71) Applicant: AISIN AW CO., LTD., Anjo-shi, Aichi-ken (JP)

(72) Inventors: Yoshihiro Takikawa, Tsushima (JP); Yoichi Oi, Ama (JP); Takayuki Miyaoka, Anjo (JP); Yuichiro Hirai, Okazaki (JP)

(73) Assignee: AISIN AW CO., LTD., Anjo-shi, Aichi-Ken (JP)

( * ) Notice: Subject to any disclaimer, the term of this patent is extended or adjusted under 35 U.S.C. 154(b) by 314 days.

(21) Appl. No.: 14/901,554

(22) PCT Filed: Aug. 6, 2014

(86) PCT No.: PCT/JP2014/070731
§ 371 (c)(1),
(2) Date: Dec. 28, 2015

(87) PCT Pub. No.: WO2015/020086
PCT Pub. Date: Feb. 12, 2015

(65) Prior Publication Data
US 2016/0160959 A1 Jun. 9, 2016

(30) Foreign Application Priority Data

Aug. 9, 2013 (JP) .................................. 2013-166092
Aug. 9, 2013 (JP) .................................. 2013-166093
Aug. 5, 2014 (JP) .................................. 2014-159510

(51) Int. Cl.
*F16F 15/14* (2006.01)

(52) U.S. Cl.
CPC .................................. *F16F 15/145* (2013.01)

(58) Field of Classification Search
CPC .... F16F 15/145; F16F 2230/007; F16F 15/14; F16F 15/1214; F16F 2228/001; F16F 2232/02
See application file for complete search history.

(56) References Cited

U.S. PATENT DOCUMENTS 8,881,622 B2 * 11/2014 Maienschein ......... F16F 15/145
74/570.2
8,925,420 B2 * 1/2015 Wysgol .................. F16F 15/145
74/574.1
(Continued)

FOREIGN PATENT DOCUMENTS

DE 102004011830 * 9/2004
DE 10 2011 013 232 A1 9/2011
(Continued)

OTHER PUBLICATIONS

English Abstract of DE 102012223563 A1, Kooy, Jun. 18, 2014.*
(Continued)

*Primary Examiner* — Vinh Luong
(74) *Attorney, Agent, or Firm* — Sughrue Mion, PLLC

(57) ABSTRACT

A cushioning member between plate bodies of a mass body and at end portions, in the circumferential direction, so as not to rotate relative to the plate bodies. The peripheral edges, on both sides in the width direction, of the outer peripheral surfaces of the cushioning member's first and second side portions abutting against a support member, along with swing of the mass body, are chamfered, reducing the possibility that the cushioning member enters in a clearance between the side surfaces of the support member and the plate bodies when the cushioning members' first side portion and the support member abut, or when the cushioning member's second side portion and the support member (Continued)

abut, along with swing of the mass body, suppressing damage to the cushioning member.

20 Claims, 8 Drawing Sheets

(56) References Cited

U.S. PATENT DOCUMENTS

| | | | | |
|---|---|---|---|---|
| 9,709,127 | B2* | 7/2017 | Takikawa | F16F 15/145 |
| 2001/0032764 | A1* | 10/2001 | Hasegawa | B60G 13/16 |
| | | | | 188/378 |
| 2002/0062713 | A1 | 5/2002 | Feldhaus et al. | |
| 2012/0180473 | A1 | 7/2012 | Huegel et al. | |
| 2013/0239745 | A1 | 9/2013 | Maienschein et al. | |
| 2013/0283967 | A1* | 10/2013 | Movlazada | F16F 15/145 |
| | | | | 74/574.2 |
| 2015/0176676 | A1* | 6/2015 | Dinger | F16F 15/145 |
| | | | | 74/574.2 |
| 2015/0204416 | A1* | 7/2015 | Schnaedelbach | F16F 15/145 |
| | | | | 74/574.2 |
| 2016/0195159 | A1* | 7/2016 | Takikawa | F16F 15/145 |
| | | | | 74/574.2 |

FOREIGN PATENT DOCUMENTS

| | | | | |
|---|---|---|---|---|
| DE | 102012223563 A1 * | 6/2014 | | F16F 15/145 |
| JP | 2013-506100 A | 2/2013 | | |
| JP | 2013-522549 A | 6/2013 | | |
| WO | WO 2012083928 A1 * | 6/2012 | | F16F 15/145 |
| WO | WO 2015/165455 A1 * | 11/2015 | | |

OTHER PUBLICATIONS

EPO Machine Translation of WO2012083928 (A1), Kuehnle et al., Jun. 28, 2012.*
International Search Report of PCT/JP2014/070731, dated Sep. 9, 2014. [PCT/ISA/210].
Written Opinion of PCT/JP2014/070731, dated Sep. 9, 2014. [PCT/ISA/237].

* cited by examiner

US 10,072,728 B2

CENTRIFUGAL-PENDULUM VIBRATION ABSORBING DEVICE

CROSS REFERENCE TO RELATED APPLICATIONS

This application is a National Stage of International Application No. PCT/JP2014/070731 filed Aug. 6, 2014, claiming priorities based on Japanese Patent Application Nos. 2013-166092, filed Aug. 9, 2013, 2013-166093, filed Aug. 9, 2013, and 2014-159510, filed Aug. 5, 2014, the contents of all of which are incorporated herein by reference in their entirety.

TECHNICAL FIELD

The present disclosure relates to a centrifugal-pendulum vibration absorbing device.

BACKGROUND ART

There has hitherto been proposed a centrifugal-pendulum vibration absorbing device that includes a support member attached to a rotary element and a plurality of mass bodies each swingably supported by the support member and disposed adjacent to each other in the circumferential direction (see Patent Document 1, for example). In the centrifugal-pendulum vibration absorbing device, each of the mass bodies includes two arcuate plate bodies that face each other via the support member, and a cushioning member is attached at both end portions, in the circumferential direction, of the plate bodies to reduce a shock of collision between the mass bodies.

RELATED-ART DOCUMENTS

Patent Documents

[Patent Document 1] German Patent Application Publication No. 10 2011 013 232 A1

SUMMARY

Besides the configuration discussed above, there is also considered a centrifugal-pendulum vibration absorbing device in which a plurality of mass bodies are swingably supported by a support member and disposed adjacent to each other in the circumferential direction, and in which each of the mass bodies includes two plate bodies coupled to face each other via the support member with a cushioning member attached between the two plate bodies. In such a configuration, the cushioning member and the support member may abut (collide) against each other along with swing of each of the mass bodies. Therefore, depending on the shape of the cushioning member, the cushioning member may be caught between the support member and the plate bodies of each of the mass bodies when the cushioning member and the support member collide against each other, which may incur degradation of and damage to the cushioning member.

It is a main object of the centrifugal-pendulum vibration absorbing device according to the present disclosure to suppress degradation of and damage to a cushioning member attached to each of mass bodies.

In order to achieve the foregoing main object, the centrifugal-pendulum vibration absorbing device according to the present disclosure adopts the following configuration.

The present disclosure provides
a centrifugal-pendulum vibration absorbing device including:
a support member attached to a rotary element; and
a plurality of mass bodies each swingably supported by the support member and disposed adjacent to each other in a circumferential direction, in which:
the mass bodies each include two plate bodies coupled to face each other via the support member;
a cushioning member is attached between the two plate bodies;
the cushioning member includes a first abutment portion that abuts against the support member along with swing of each of the mass bodies; and
peripheral edges, on both sides in a coupling direction of the two plate bodies, of the first abutment portion of the cushioning member are chamfered.

In the centrifugal-pendulum vibration absorbing device according to the present disclosure, the cushioning member is attached between the two plate bodies of each of the mass bodies; the cushioning member includes the first abutment portion which abuts against the support member along with swing of each of the mass bodies; and peripheral edges, on both sides in a coupling direction of the two plate bodies, of the first abutment portion are chamfered. Thus, it is possible to reduce the possibility that the cushioning member is caught between (the side surface of) the support member and (the side surfaces of) the plate bodies when the cushioning member and the support member collide against each other along with swing of each of the mass bodies. As a result, it is possible to suppress application of a large force to a part of the cushioning member, and to suppress degradation of and damage to the cushioning member. The term "coupling direction of the two plate bodies" means a direction that is parallel to the rotational axis of the rotary element.

In the thus configured centrifugal-pendulum vibration absorbing device according to the present disclosure, the cushioning member may be attached between the two plate bodies and at both end portions, in a circumferential direction, of the two plate bodies. This allows a reduction in shock of collision between the mass bodies which are adjacent to each other in the circumferential direction.

In the centrifugal-pendulum vibration absorbing device according to the present disclosure, in addition, the cushioning member may be attached between the two plate bodies so as not to be rotatable with respect to the two plate bodies.

In the centrifugal-pendulum vibration absorbing device according to the aspect of the present disclosure in which the cushioning member is attached between the two plate bodies so as not to be rotatable with respect to the two plate bodies, at least one of the two plate bodies may be provided with a projecting portion that projects in the coupling direction of the two plate bodies; and the cushioning member may be constituted as a frame body, an inner periphery of which matches an outer periphery of the projecting portion, and attached to the projecting portion.

In the centrifugal-pendulum vibration absorbing device according to the aspect of the present disclosure in which the cushioning member is attached to the projecting portion, the projecting portion may project on an inner side with respect to end surfaces, in the circumferential direction, of the plate bodies; the cushioning member may include a second abutment portion that abuts against a cushioning member attached to one of the adjacent mass bodies in the circumferential direction along with swing of each of the mass bodies; and the two plate bodies may be formed such that a space is formed on a side of the end surfaces, in the circumferential direction, with respect to the projecting portion and between surfaces (portions) that face each other and both end surfaces, in the coupling direction, of the cushioning member. This allows the cushioning member to be deformed to enter in the space when the respective cushioning members of the mass bodies which are adjacent to each other in the circumferential direction abut (collide) against each other. Thus, it is possible to reduce the possibility that the cushioning member is caught between the end surface, in the circumferential direction, of the mass body (two plate bodies), to which the cushioning member is attached, and the end surface, in the circumferential direction, of the adjacent mass body (two plate bodies) in the circumferential direction. As a result, it is possible to suppress application of a large force to a part of the cushioning member, and to suppress degradation of and damage to the cushioning member. In the centrifugal-pendulum vibration absorbing device according to such an aspect of the present disclosure, the two plate bodies may be formed such that the end surfaces, in the circumferential direction, of the two plate bodies and a surface of contact of the projecting portion with an inner peripheral surface of the second abutment portion are continuous with each other through an inclined surface. This allows the cushioning member to be deformed along the inclined surface when the respective cushioning members of the mass bodies which are adjacent to each other in the circumferential direction collide against each other. In the centrifugal-pendulum vibration absorbing device according to such an aspect of the present disclosure, in addition, the cushioning member may be formed such that thickness of the second abutment portion is smaller than thickness of the first abutment portion. This allows a reduction in amount of a material used to form the cushioning member compared to a configuration in which the thickness of the second abutment portion is generally equal to the thickness of the first abutment portion.

In the centrifugal-pendulum vibration absorbing device according to the aspect of the present disclosure in which the cushioning member is attached to the projecting portion, in addition, the cushioning member may be constituted as a polygonal frame body.

In the centrifugal-pendulum vibration absorbing device according to the aspect of the present disclosure in which the cushioning member is attached between the two plate bodies so as not to be rotatable with respect to the two plate bodies, the support member may include a small-diameter portion and a large-diameter portion that projects radially outward with respect to the small-diameter portion and that swingably supports each of the mass bodies; and the first abutment portion of the cushioning member may include a large-diameter abutment portion that abuts against an end surface, in the circumferential direction, of the large-diameter portion along with swing of each of the mass bodies, and a small-diameter abutment portion that abuts against an outer peripheral surface of the small-diameter portion along with swing of each of the mass bodies.

In the centrifugal-pendulum vibration absorbing device according to the aspect of the present disclosure in which the first abutment portion of the cushioning member includes the large-diameter abutment portion and the small-diameter abutment portion, the cushioning member may be formed such that thickness of the small-diameter abutment portion is smaller than thickness of the large-diameter abutment portion. This allows a reduction in amount of a material used to form the cushioning member compared to a configuration in which the thickness of the small-diameter abutment portion is generally equal to the thickness of the large-diameter abutment portion.

In the centrifugal-pendulum vibration absorbing device according to the present disclosure, each of the mass bodies may be supported by the support member so as to be swingable about a pendulum fulcrum and rotatable about a center of gravity. This makes it possible to damp vibration to be transmitted to the support member utilizing not only rotation about the pendulum fulcrum but also a rotation moment of each of the mass bodies about the center of gravity. As a result, the vibration damping effect of the centrifugal-pendulum vibration absorbing device can be further improved.

DETAILED DESCRIPTION OF THE PREFERRED EMBODIMENT

Now, a mode for carrying out the present disclosure will be described by way of an embodiment.

Figure 1:
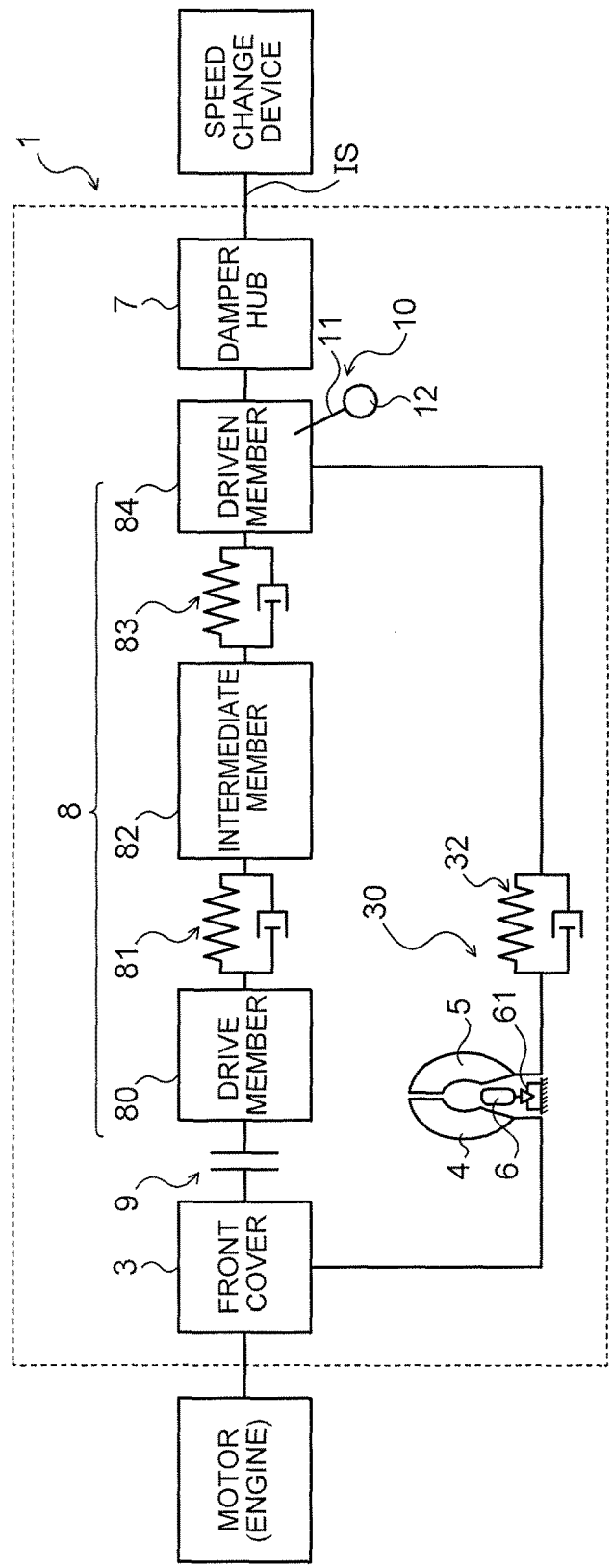
FIG. 1 is a diagram illustrating a schematic configuration of a starting device 1 that includes a centrifugal-pendulum vibration absorbing device 10 according to an embodiment of the present invention.
Figure 2:
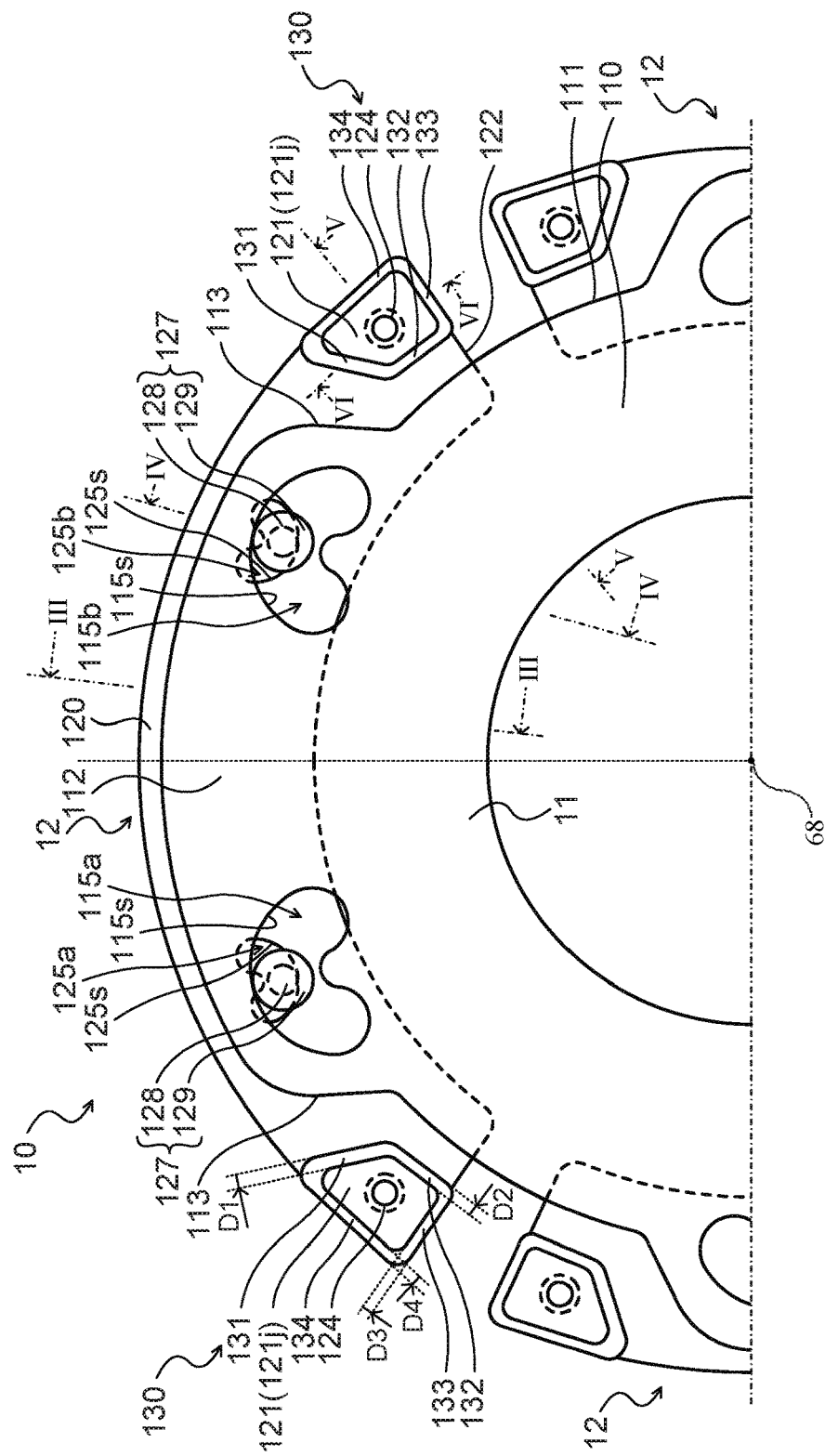
FIG. 2 illustrates a schematic configuration of the centrifugal-pendulum vibration absorbing device 10.
Figure 3:
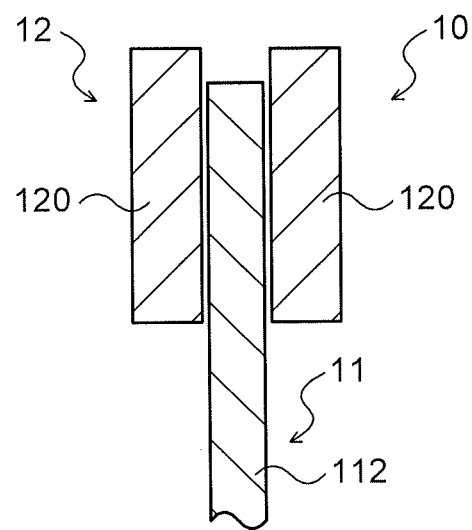
FIG. 3 is an III-III sectional view illustrating an III-III section of the centrifugal-pendulum vibration absorbing device 10 of FIG. 2.

FIG. 1 is a diagram illustrating a schematic configuration of a starting device 1 that includes a centrifugal-pendulum vibration absorbing device 10 according to an embodiment of the present disclosure. FIG. 2 illustrates a schematic configuration of the centrifugal-pendulum vibration absorbing device 10. FIGS. 3 to 6 are an A-A sectional view, a B-B sectional view, a C-C sectional view, and a D-D sectional view illustrating an A-A section, a B-B section, a C-C section, and a D-D section, respectively, of the centrifugal-pendulum vibration absorbing device 10 of FIG. 2.

As illustrated in the drawings, a starting device 1 according to the embodiment is mounted on a vehicle, and constituted as a device that transmits power from an engine (internal combustion engine) that serves as a motor to an automatic transmission (AT) or a continuously variable transmission (CVT) that serves as a speed change device. The starting device 1 includes: a front cover (an input member) 3 coupled to a crankshaft of the engine; a pump impeller (an input-side fluid transmission element) 4 fixed to the front cover 3; a turbine runner (an output-side fluid transmission element) 5 disposed coaxially with the pump impeller 4 so as to be rotatable; a stator 6 that rectifies a flow of working oil (a working fluid) from the turbine runner 5 to the pump impeller 4; a damper hub (an output member) 7 fixed to an input shaft IS of the speed change device; a damper mechanism 8 connected to the damper hub 7; a single-plate friction or multi-plate friction lock-up clutch mechanism 9 interposed between the front cover 3 and the damper mechanism 8; and a centrifugal-pendulum vibration absorbing device 10 and a dynamic damper 30 coupled to the damper mechanism 8.

The pump impeller 4 and the turbine runner 5 face each other. The stator 6 is disposed between and coaxially with the pump impeller 4 and the turbine runner 5 so as to be rotatable. The rotational direction of the stator 6 is set to one direction by a one-way clutch 61. The pump impeller 4, the turbine runner 5, and the stator 6 form a torus (an annular flow passage) that allows circulation of working oil, and function as a torque converter with a torque amplification function. In the starting device 1, the stator 6 and the one-way clutch 61 may be omitted, and the pump impeller 4 and the turbine runner 5 may function as a fluid coupling.

The damper mechanism 8 includes: a drive member (an input element) 80 that is rotatable together with a lock-up piston of the lock-up clutch mechanism 9; a plurality of first coil springs (first elastic bodies) 81; an intermediate member (an intermediate element) 82 engaged with the drive member 80 via the plurality of first coil springs 81; a plurality of second coil springs (second elastic bodies) 83; and a driven member (an output element) 84 engaged with the intermediate member 82 via the plurality of second coil springs 83 and fixed to the damper hub 7.

The lock-up clutch mechanism 9 is a mechanism that operates using a hydraulic pressure from a hydraulic control device (not illustrated). The lock-up clutch mechanism 9 establishes and releases lock-up in which the front cover (an input member) 3 and the damper hub 7, that is, the input shaft IS of the speed change device, are coupled to each other via the damper mechanism 8. When lock-up is established by the lock-up clutch mechanism 9, power from the engine which serves as a motor is transferred to the input shaft IS of the speed change device via the front cover 3, the lock-up clutch mechanism 9, the drive member 80, the first coil springs 81, the intermediate member 82, the second coil springs 83, the driven member 84, and the damper hub 7. In this event, fluctuations in torque input to the front cover 3 are mainly absorbed by the first coil springs 81 and the second coil springs 83 of the damper mechanism 8.

The dynamic damper 30 is coupled to the driven member 84 of the damper mechanism 8, and includes the turbine runner 5 which serves as a mass body and a plurality of third springs (third elastic bodies) 32 interposed between the driven member 84 and the turbine runner 5. The "dynamic damper" is a mechanism that absorbs (damps) vibration of a vibrating body by applying vibration in the opposite phase at a frequency (engine rotational speed) that coincides with the resonance frequency of the vibrating body to the vibrating body, and is constituted by coupling the springs and the mass body to each other such that the spring and the mass body are not included in the torque transfer path. The dynamic damper 30 can be caused to act at a desired frequency by adjusting the rigidity of the third springs and the weight of the mass body. With the dynamic damper 30 coupled to the driven member 84 of the damper mechanism 8, vibration of the driven member 84, and hence the entire damper mechanism 8, can be absorbed (damped) well by both the centrifugal-pendulum vibration absorbing device 10 and the dynamic damper 30 during lock-up.

As illustrated in FIG. 2, the centrifugal-pendulum vibration absorbing device 10 includes: a support member (a flange) 11 coaxially attached to the driven member 84 (see FIG. 1), which serves as a rotary element, of the damper mechanism 8; and a plurality of (in the embodiment, three) mass bodies 12 each swingably supported by the support member 11 and disposed adjacent to each other in the circumferential direction (on a circle centered on the axis of the driven member 84 and the support member 11). In the centrifugal-pendulum vibration absorbing device 10, along with rotation of the support member 11, the plurality of mass bodies 12 are swung with respect to the support member 11 to apply vibration in the phase opposite to that of vibration (resonance) of the driven member 84 of the damper mechanism 8 to the driven member 84 to absorb vibration.

The support member 11 is constituted as an annular plate formed by pressing or the like of a metal plate formed of iron or the like, for example, and coupled to the driven member 84 of the damper mechanism 8 via a rivet (not illustrated). Thus, the support member 11 is rotated coaxially and together with the driven member 84. It should be noted, however, that the support member 11 may be coupled to the drive member 80 or the intermediate member 82 of the damper mechanism 8.

In addition, the support member 11 includes a small-diameter portion 110, and a plurality of (in the embodiment, three) large-diameter portions 112 that project radially outward from the small-diameter portion 110 and that swingably support the respective mass bodies 12. As seen in the axial direction of the support member 11 (the direction of penetrating the sheet surface of FIG. 2), end surfaces 113 of the large-diameter portions 112 in the circumferential direction are each formed as a curved surface in an arcuate shape in section that is convex toward the outer side in the circumferential direction (toward an end portion, in the circumferential direction, of the mass body 12). In addition, each of the large-diameter portions 112 is provided with two guide opening portions (support member-side guide notch portions) 115a and 115b for guiding two guide rollers 127 together with two guide opening portions 125a and 125b of the corresponding mass body 12 such that the mass body 12 is moved along a track determined in advance. The guide opening portion 115a and the guide opening portion 115b are formed as long holes that are asymmetrical and that each extend with a curve that is convex toward the radially outer side of the support member 11 as an axis, and formed to be shaped as a mirror image of each other. It should be noted, however, that the guide opening portion 115a and the guide opening portion 115b may also be formed as long holes that are symmetrical. One guide opening portion 115a and one guide opening portion 115b are provided for each of the mass bodies 12, spaced from each other, and disposed in the circumferential direction symmetrically about the swing center line of the mass body 12 (a line that connects between the pendulum fulcrum 68 (the axial center of the starting device 1 and the centrifugal-pendulum vibration absorbing device 10) and the point of application (see the dotted line in FIG. 2)).

As illustrated in FIGS. 2 to 6, each of the mass bodies 12 includes: two plate bodies 120 that serve as weights coupled to face each other in the axial direction of the support member 11; two rivets 124 that serve as coupling members that couple the two plate bodies 120 to each other at both end portions in the circumferential direction; two guide opening portions (mass body-side guide notch portions) 125a and 125b formed in each of the plate bodies 120; two guide rollers 127 that are guided by the guide opening portions 125a and 125b and the guide opening portions 115a and 115b of the support member 11 to roll; and cushioning members 130 attached to attachment portions 121 formed by projecting portions 121j of the two plate bodies 120.

Figure 5:
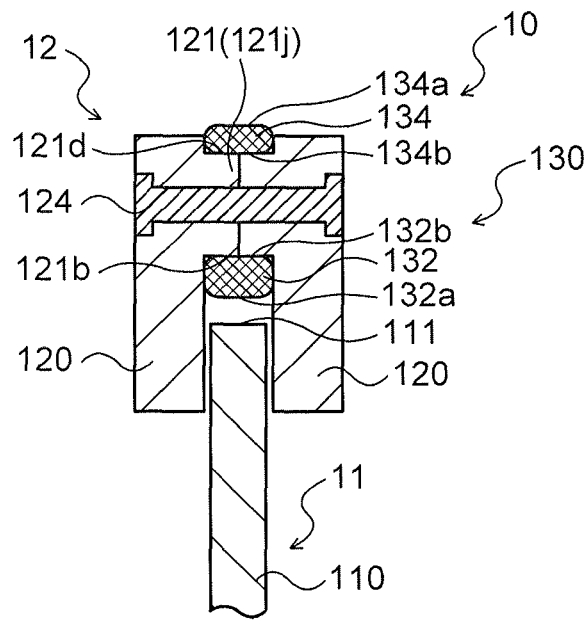
FIG. 5 is a V-V sectional view illustrating a V-V section of the centrifugal-pendulum vibration absorbing device 10 of FIG. 2.
Figure 6:
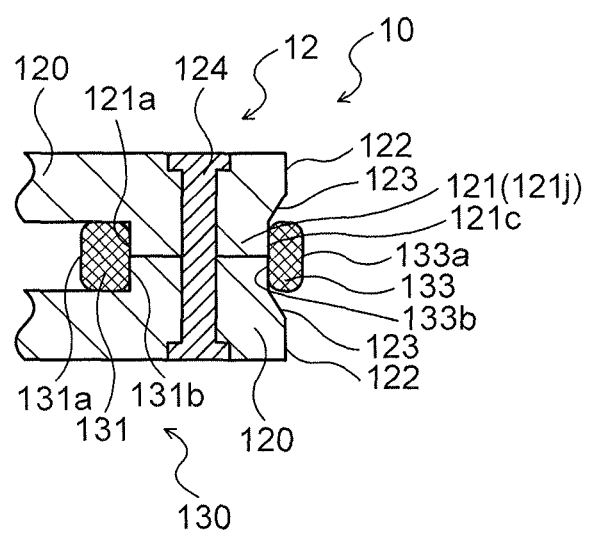
FIG. 6 is a VI-VI sectional view illustrating a VI-VI section of the centrifugal-pendulum vibration absorbing device 10 of FIG. 2.

The plate bodies 120 are formed of iron or the like. As illustrated in FIG. 2, each of the plate bodies 120 is curved in a generally arcuate shape so as to extend along the outer periphery of the large-diameter portion of the support member 11 and formed in a symmetrical shape about the swing center line (see the dotted line in FIG. 2) of the mass body 12 as seen in the axial direction of the support member 11. As illustrated in FIGS. 2 and 6, the projecting portions 121j are formed at both end portions, in the circumferential direction, of each of the plate bodies 120 slightly on the inner side with respect to an end surface 122 in the circumferential direction and on the outer peripheral side (the outer side in the radial direction (a direction that is orthogonal to the axial direction of the driven member 84 and the support member 11 and away from the axis of the driven member 84 and the support member 11)) of the small-diameter portion 110 of the support member 11. The projecting portions 121j project in a coupling direction of the two plate bodies 120 (toward the plate body 120 that is opposite in a direction that is parallel to the rotational axis of the driven member 84 which serves as a rotary element). As illustrated in FIGS. 2, 5, and 6, the two plate bodies 120 are coupled to each other by the rivets 124 with the respective projecting portions 121j abutting against each other.

The guide opening portion 125a and the guide opening portion 125b of each of the mass bodies 12 are formed as long holes that are asymmetrical and that each extend with a curve that is convex toward the center (pendulum fulcrum) of the support member 11 as an axis, and formed to be shaped as a mirror image of each other. It should be noted, however, that the guide opening portions 125a and 125b may be formed as long holes that are symmetrical. One guide opening portion 125a and one guide opening portion 125b are provided for each of the mass bodies 12, spaced from each other, and disposed in the circumferential direction symmetrically about the swing center line of the mass body 12 (see the dotted line in FIG. 2).

Figure 4:
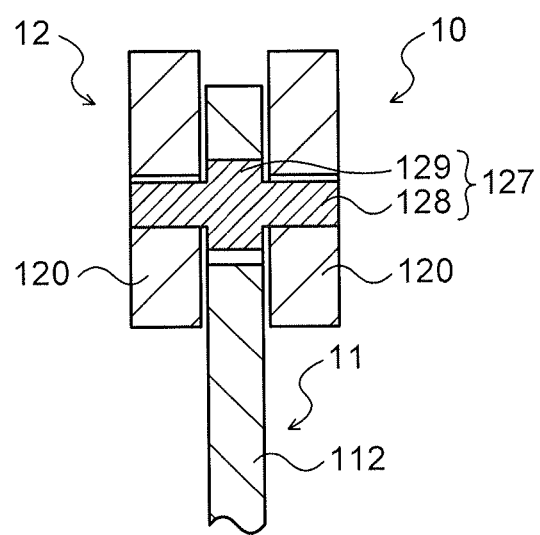
FIG. 4 is a IV-IV sectional view illustrating a IV-IV section of the centrifugal-pendulum vibration absorbing device 10 of FIG. 2.

As illustrated in FIGS. 2 and 4, each of the guide rollers 127 is constituted by integrating a small-diameter roller 128 and a large-diameter roller 129 with each other. The small-diameter rollers 128 project on both sides, in the axial direction, of the large-diameter rollers 129, and are rollably inserted into the guide opening portions 125a and 125b of the two plate bodies 120 to be rollably supported by the mass bodies 12, that is, the two plate bodies 120. The small-diameter roller 128 basically rolls along an inner peripheral surface 125s on the radially inner side of the corresponding guide opening portion 125a or 125b. In addition, the large-diameter roller 129 is rollably disposed in the guide opening portion 115a or 115b corresponding to the guide opening portion 125a or 125b of each of the mass bodies 12. Consequently, each of the mass bodies 12 is swingably supported by the support member 11. The large-diameter roller 129 basically rolls along an inner peripheral surface 115s on the radially outer side of the corresponding guide opening portion 115a or 115b. With such a configuration, when the support member 11 is rotated, each of the mass bodies 12 is swung with respect to the support member 11 while being guided by the guide opening portions 125a or 125b and the guide opening portions 115a or 115b via the guide rollers 127.

In each of the mass bodies 12, as illustrated in FIGS. 2, 5, and 6, the cushioning member 130 which is formed of an elastic body such as a rubber material is attached to the attachment portion 121 which is formed by the projecting portions 121j of the two plate bodies 120. The cushioning member 130 is formed as a trapezoidal frame body that includes a first side portion 131 to a fourth side portion 134 as seen in the axial direction of the support member 11. In addition, the attachment portion 121 is formed in a trapezoidal shape that matches inner peripheral surfaces 131b to 134b of the first side portion 131 to the fourth side portion 134 of the cushioning member 130 as seen in the axial direction of the support member 11. Consequently, the cushioning member 130 can be made non-rotatable with respect to the attachment portion 121 (mass body 12). In addition, the attachment portion 121 can be increased in size, that is, the weight of the mass body 12 can be increased.

As illustrated in FIG. 2, when the cushioning member 130 is attached to the attachment portion 121, the first side portion 131 extends generally opposite, in the circumferential direction, to the end surface 113, in the circumferential direction, of the corresponding large-diameter portion 112 of the support member 11. In addition, the second side portion 132 is continuous with the first side portion 131 with an obtuse angle provided therebetween, and extends generally opposite, in the radial direction, to an outer peripheral surface 111 of the small-diameter portion 110 of the support member 11. Further, the third side portion 133 is continuous with the second side portion 132 with a right angle provided therebetween, and extends generally opposite, in the circumferential direction, to the cushioning member 130 which is attached to the adjacent mass body 12 in the circumferential direction (generally in parallel with the end surface 122, in the circumferential direction, of the mass body 12 (plate bodies 120)). The fourth side portion 134 is continuous with both the third side portion 133 and the first side portion 131 at a generally right angle and an acute angle, respectively, and extends generally in parallel with the second side portion 132. Thus, an outer peripheral surface 131a (see FIG. 6) of the first side portion 131 occasionally abuts (collides) against the end surface 113, in the circumferential direction, of the large-diameter portion 112 of the support member 11 along with swing of the mass body 12. In addition, an outer peripheral surface 132a (see FIG. 5) of the second side portion 132 occasionally abuts (collides) against the outer peripheral surface 111 of the small-diameter portion 110 of the support member 11 along with swing of the mass body 12. Further, an outer peripheral surface 133a (see FIG. 6) of the third side portion 133 occasionally abuts (collides) against an outer peripheral surface 133a of the third side portion 133 of the cushioning member 130 which is attached to the adjacent mass body 12 in the circumferential direction along with swing of the mass body 12. It should be noted, however, that the fourth side portion 134 does not abut against the support member 11 or another cushioning member 130 along with swing of the mass body 12.

As illustrated in FIGS. 5 and 6, the peripheral edges, on both sides in the width direction (the coupling direction of the two plate bodies 120 (a direction that is parallel to the rotational axis of the driven member 84 which serves as a rotary element)), which is the left-right direction in FIG. 5 and the up-down direction in FIG. 6), of the outer peripheral surfaces 131a to 134a and the inner peripheral surfaces 131b to 134b of the first side portion 131 to the fourth side portion 134, respectively, of the cushioning member 130 are chamfered. In addition, the cushioning member 130 is formed such that a thickness D1 of the first side portion 131, a thickness D2 of the second side portion 132, a thickness D3 of the third side portion 133, and a thickness D4 of the fourth side portion 134 meet "D1>D2>D3>D4" (see FIG. 2).

The outer peripheral surface 131a and the inner peripheral surface 131b of the first side portion 131 and the outer peripheral surface 121a of the attachment portion 121 (a surface that contacts the inner peripheral surface 131b of the first side portion 131) are formed as a curved surface in an arcuate shape in section in which the center portion in the longitudinal direction is convex toward the outer side in the circumferential direction of the mass body 12 with respect to both end portions as seen in the axial direction of the support member 11. Specifically, such surfaces are formed as a curved surface with a radius of curvature that is equal to the radius of curvature of the end surface 113, in the circumferential direction, of the large-diameter portion 112 of the support member 11. The outer peripheral surfaces 132a to 134a and the inner peripheral surfaces 132b to 134b of the second side portion 132 to the fourth side portion 134, respectively, and the outer peripheral surfaces 124b to 121d of the attachment portion 121 (surfaces that contact the inner peripheral surfaces 132b to 134b of the second side portion 132 to the fourth side portion 134, respectively) are formed in a straight shape in section (as a flat surface) as seen in the axial direction of the support member 11.

As discussed above, each of the attachment portions 121 of each of the mass bodies 12 is provided slightly on the inner side (left side in FIG. 6) with respect to the end surface 122, in the circumferential direction, of each of the plate bodies 120, and each of the cushioning members 130 is attached to each of the attachment portions 121. The end surface 122, in the circumferential direction, of each of the plate bodies 120 and the outer peripheral surface 121c of the attachment portion 121 are formed to be continuous with each other through an inclined surface 123. Thus, in each of the mass bodies 12, a space is formed between the inclined surfaces 123 of the two plate bodies 120 and both side surfaces of the third side portion 133 of the cushioning member 130 (both end surfaces in the coupling direction of the two plate bodies 120) on the side of the end surfaces 122, in the circumferential direction, with respect to the attachment portion 121.

Now, operation of the centrifugal-pendulum vibration absorbing device 10 according to the embodiment configured as described above will be described. In the centrifugal-pendulum vibration absorbing device 10 according to the embodiment, when the support member 11 is rotated, the plurality of mass bodies 12 are swung in the same direction with respect to the support member 11 while being guided by the guide opening portions 125a and 125b and the guide opening portions 115a and 115b via the guide rollers 127 along with the rotation. Consequently, vibration that is opposite in phase to vibration of the driven member 84 can be applied to the driven member 84 to absorb (damp) vibration.

In the embodiment, as discussed above, the guide opening portion 125a and the guide opening portion 125b of each of the mass bodies 12 are formed as long holes that are asymmetrical (or symmetrical) and that each extend with a curve that is convex toward the center of the support member 11 as an axis, and disposed symmetrically to each other with respect to the swing center line of the mass body 12. In addition, the guide opening portion 115a and the guide opening portion 115b of the support member 11 corresponding to each of the mass bodies 12 are formed as long holes that are asymmetrical (or symmetrical) and that each extend with a curve that is convex toward the radially outer side of the support member 11 as an axis, and disposed symmetrically to each other with respect to the swing center line of the mass body 12. Thus, in the centrifugal-pendulum vibration absorbing device 10 according to the embodiment, each of the mass bodies 12 can be turned about the pendulum fulcrum along with rotation of the support member 11, and rotated about the center of gravity of the mass body 12 as the mass body 12 is shaken to one side within the swing range. In this way, with the mass bodies 12 supported by the support member 11 so as to be turnable about the pendulum fulcrum and rotatable about the center of gravity, it is possible to damp vibration transferred to the support member 11 utilizing not only swing motion of the mass bodies 12 about the pendulum fulcrum but also a rotation moment of the mass bodies 12 about the center of gravity.

Figure 7:
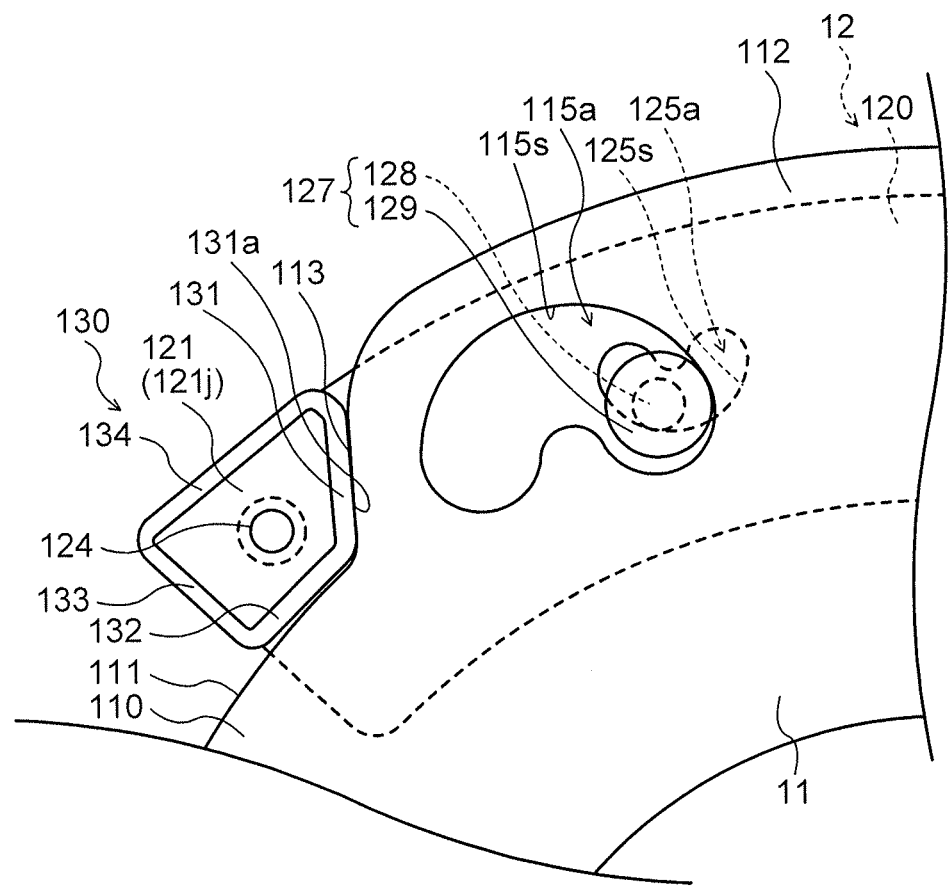
FIG. 7 illustrates the centrifugal-pendulum vibration absorbing device 10 at the time when a first side portion 131 of a cushioning member 130 and an end surface 113, in the circumferential direction, of a large-diameter portion 112 of a support member 11 abut against each other.
Figure 8:
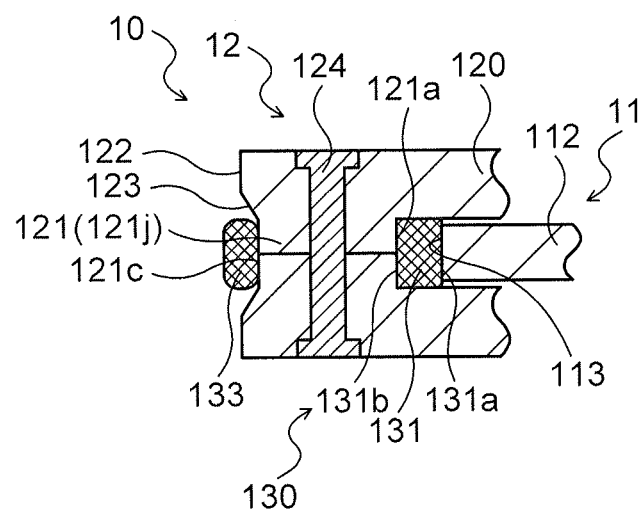
FIG. 8 illustrates the centrifugal-pendulum vibration absorbing device 10 at the time when the first side portion 131 of the cushioning member 130 and the end surface 113, in the circumferential direction, of the large-diameter portion 112 of the support member 11 abut against each other.
Figure 9:
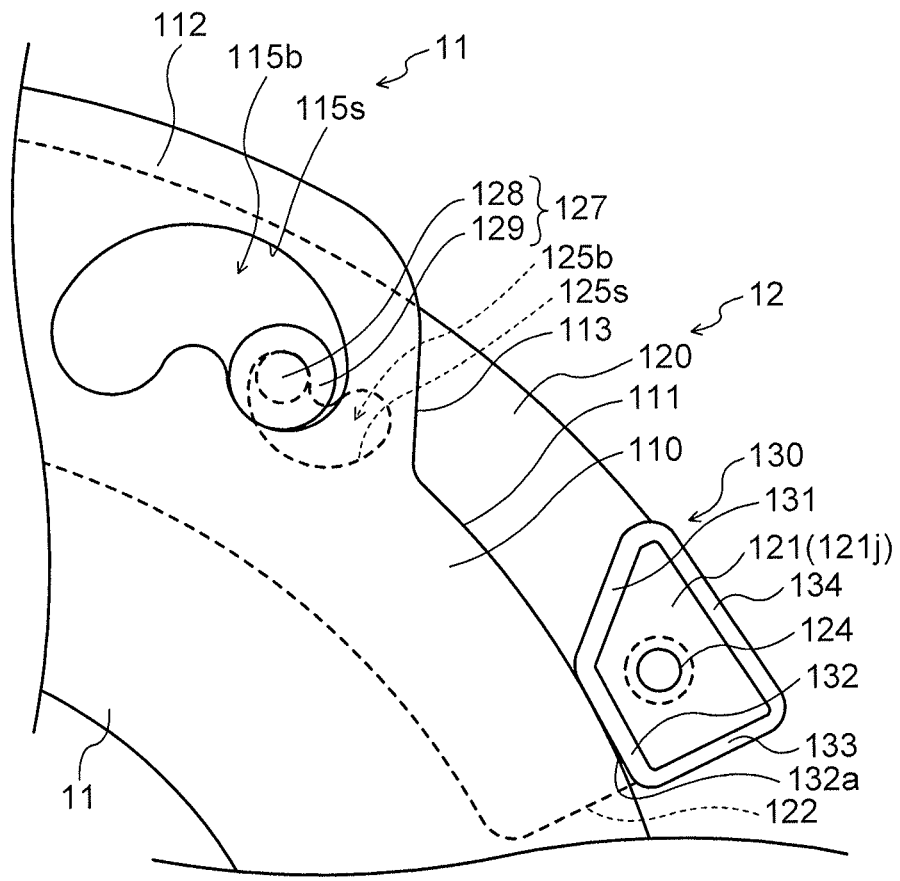
FIG. 9 illustrates the centrifugal-pendulum vibration absorbing device 10 at the time when a second side portion 132 of the cushioning member 130 and an outer peripheral surface 111 of a small-diameter portion 110 of the support member 11 abut against each other.
Figure 10:
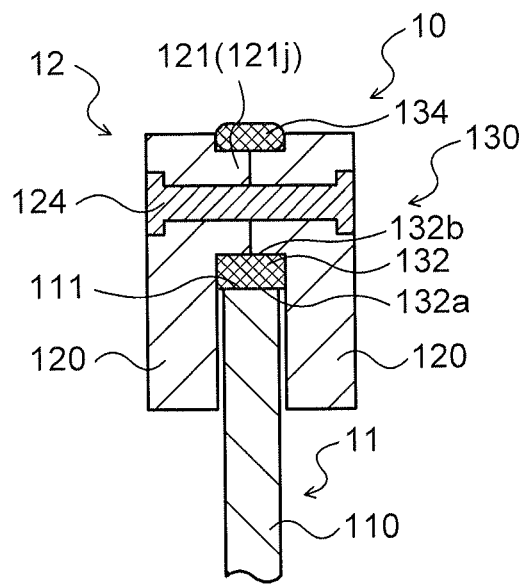
FIG. 10 illustrates the centrifugal-pendulum vibration absorbing device 10 at the time when the second side portion 132 of the cushioning member 130 and the outer peripheral surface 111 of the small-diameter portion 110 of the support member 11 abut against each other.
Figure 11:
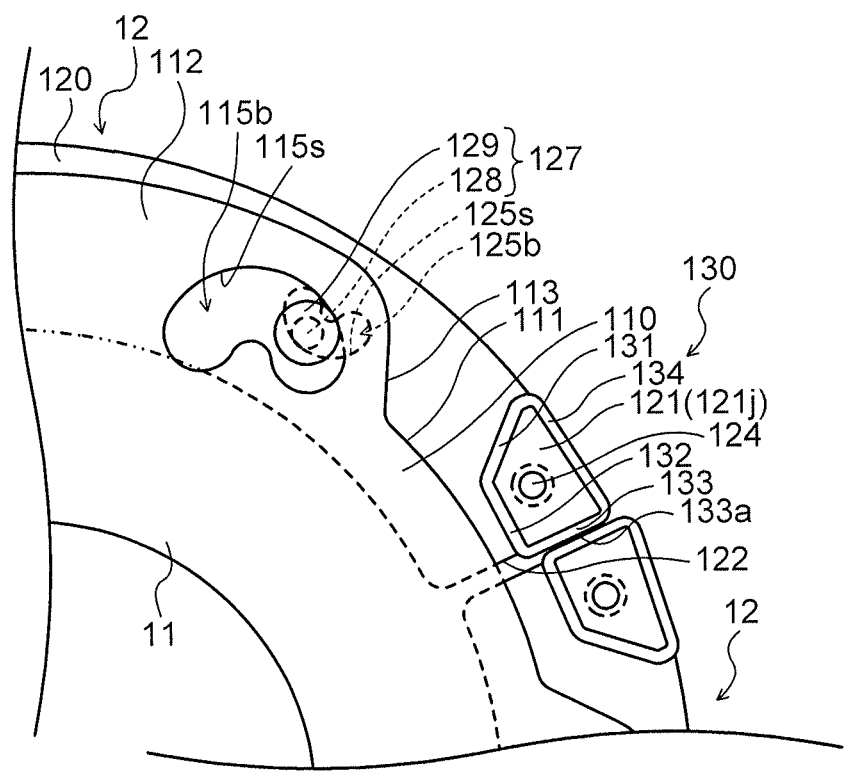
FIG. 11 illustrates the centrifugal-pendulum vibration absorbing device 10 at the time when respective third side portions 133 of the cushioning members 130 of the mass bodies 12 which are adjacent to each other in the circumferential direction abut against each other.
Figure 12:
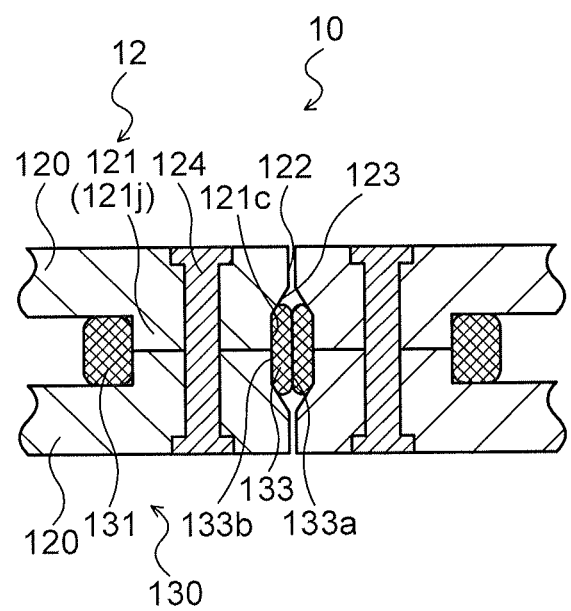
FIG. 12 illustrates the centrifugal-pendulum vibration absorbing device 10 at the time when the respective third side portions 133 of the cushioning members 130 of the mass bodies 12 which are adjacent to each other in the circumferential direction abut against each other.

When each of the mass bodies 12 is swung, there may be caused a first type collision in which the outer peripheral surface 131a of the first side portion 131 of the cushioning member 130 and the end surface 113, in the circumferential direction, of the large-diameter portion 112 of the support member 11 abut (collide) against each other as illustrated in FIGS. 7 and 8; there may be caused a second type collision in which the outer peripheral surface 132a of the second side portion 132 of the cushioning member 130 and the outer peripheral surface 111 of the small-diameter portion 110 of the support member 11 abut (collide) against each other as illustrated in FIGS. 9 and 10; and there may be caused a third type collision in which the outer peripheral surface 133a of the third side portion 133 of the cushioning member 130 and the outer peripheral surface 133a of the third side portion 133 of the cushioning member 130 which is attached to the adjacent mass body 12 in the circumferential direction abut (collide) against each other as illustrated in FIGS. 11 and 12. In general, the first type collision is caused as each of the mass bodies 12 is turned about the pendulum fulcrum along with rotation of the support member 11; the second type collision is caused as each of the mass bodies 12 is turned about the pendulum fulcrum and rotated about the center of gravity along with rotation of the support member 11; and the third type collision is caused as the mass body 12 which is obliquely above the pendulum fulcrum is moved downward by the gravitational force when rotation of the support member 11 is stopped. Thus, a force applied to the cushioning members 130 at the time of collision tends to be the largest for the first type collision, the second largest for the second type collision, and the smallest for the third type collision.

In the embodiment, as discussed above, the peripheral edges, on both sides in the width direction (the coupling direction of the two plate bodies 120), of the outer peripheral surfaces 131a to 134a and the inner peripheral surfaces 131b to 134b of the cushioning member 130 are chamfered over the entire periphery. Consequently, it is possible to reduce the possibility that the cushioning member 130 enters in a clearance between the side surfaces of the plate bodies 120 of the mass body 12 and the side surface of the large-diameter portion 112 of the support member 11 to be caught therebetween when the first type collision (see FIGS. 7 and 8) occurs, and it is possible to reduce the possibility that the cushioning members 130 enters in a clearance between the side surfaces of the plate bodies 120 of the mass body 12 and the side surface of the small-diameter portion 110 of the support member 11 to be caught therebetween when the second type collision (see FIGS. 9 and 10) occurs, compared to a configuration in which the peripheral edges on both sides in the width direction are not chamfered (the peripheral edges on both sides in the width direction are formed at a generally right angle). As a result, it is possible to suppress application of a large force to a part of the cushioning member 130, and to suppress degradation of and damage to the cushioning member 130.

In the embodiment, in addition, the outer peripheral surface 131a of the first side portion 131 of the cushioning member 130 is formed to have a radius of curvature that is equal to the radius of curvature of the end surface 113 of the large-diameter portion 112 of the support member 11. Consequently, the area of contact between the first side portion 131 of the cushioning member 130 and the end surface 113 of the large-diameter portion 112 at the time when the first type collision (see FIGS. 7 and 8) occurs can be increased. As a result, a shock of the first type collision can be reduced (absorbed better), and a load applied to the first side portion 131 of the cushioning member 130 can be alleviated to improve the durability of the cushioning member 130. In the embodiment, moreover, the outer peripheral surface 131a of the first side portion 131 and the outer peripheral surface 121a of the attachment portion 121 (a surface that contacts the inner peripheral surface 131b of the first side portion 131) are formed as curved surfaces with an equal radius of curvature. Consequently, the attachment portion 121 can be increased in size while securing the thickness D1 of the first side portion 131, and the weight of the mass body 12 can be increased.

In the embodiment, further, the outer peripheral surface 132a of the second side portion 132 of the cushioning member 130 is formed in a straight shape in section (as a flat surface). Consequently, a reduction in area of contact between the second side portion 132 of the cushioning member 130 and the outer peripheral surface 111 of the small-diameter portion 110 at the time when the second type collision (see FIGS. 9 and 10) occurs can be suppressed. As a result, a shock of the second type collision can be reduced (absorbed better), and a load applied to the second side portion 132 of the cushioning member 130 can be reduced to improve the durability of the cushioning member 130.

In the embodiment, additionally, the end surface 122, in the circumferential direction, of each of the plate bodies 120 and the outer peripheral surface 121c of the attachment portion 121, which is provided on the center side with respect to the end surface 122, are formed to be continuous with each other through the inclined surface 123. Thus, in each of the mass bodies 12, a space is formed between the inclined surfaces 123 of the two plate bodies 120 and both side surfaces of the third side portion 133 of the cushioning member 130 (both end surfaces in the coupling direction of the two plate bodies 120) on the side of the end surfaces 122, in the circumferential direction, with respect to the attachment portion 121. Consequently, the third side portion 133 is deformed along the inclined surfaces 123 to enter in the space when the third type collision (see FIGS. 11 and 12) occurs, which makes it possible to reduce the possibility that the cushioning member 130 is caught between the end surface 122, in the circumferential direction, of the mass body (two plate bodies 120), to which the cushioning member 130 is attached, and the end surface 122, in the circumferential direction, of the adjacent mass body 12 (plate bodies 120) in the circumferential direction. As a result, it is possible to suppress application of a large force to a part of the cushioning member 130, and to suppress degradation of and damage to the cushioning member 130. In addition, the outer peripheral surface 133a of the third side portion 133 is formed in a straight shape (a flat surface) in section to extend generally in parallel with the end surface 122, in the circumferential direction, of the mass body 12 (plate bodies 120). Consequently, the area of contact between the respective third side portions 133 of the cushioning members 130 at the time when the third type collision occurs can be increased. As a result, a shock of the third type collision can be reduced (absorbed better), and a load applied to the third side portion 133 of the cushioning member 130 can be reduced to improve the durability of the cushioning member 130.

In the embodiment, in addition, the cushioning member 130 is formed such that the thickness D1 of the first side portion 131, the thickness D2 of the second side portion 132, the thickness D3 of the third side portion 133, and the thickness D4 of the fourth side portion 134 meet "D1>D2>D3>D4". As discussed above, a force applied to the cushioning member 130 at the time of collision tends to become sequentially smaller in the order of the first type collision, the second type collision, and the third type collision, and the fourth side portion 134 does not collide against the support member 11 or another cushioning member 130. Thus, by adjusting the thickness of the first side portion 131 to the fourth side portion 134 to the tendency described above, a force applied to the cushioning member 130 because of collision can be sufficiently reduced (absorbed), and the amount of a material used to form the cushioning member 130 can be reduced. It should be noted, however, that this is effective when the cushioning member 130 is attached so as not to be rotatable with respect to the attachment portion 121 (mass body 12) (it is generally determined against what each portion of the cushioning member 130 abuts) as in the embodiment. When the cushioning member 130 is attached so as to be rotatable with respect to the attachment portion 121 (such as when the attachment portion is formed in a circular shape and the cushioning member is formed in an annular shape, for example), that is, when it is not determined against what each portion of the cushioning member abuts, on the contrary, it is necessary to form the cushioning member 130 with approximately the same thickness as the thickness D1 of the first side portion 131 of the cushioning member 130 over the entire periphery in order to secure the durability of the cushioning member.

In the centrifugal-pendulum vibration absorbing device 10 according to the embodiment described above, the cushioning members 130 are attached between the two plate bodies 120 of the mass body 12 and at both end portions, in the circumferential direction, of the plate bodies 120 so as not to be rotatable with respect to the plate bodies 120. The cushioning member 130 includes the first side portion 131 and the second side portion 132 which abut against the support member 11 along with swing of the mass body 12, and the peripheral edges, on both sides in the width direction (the coupling direction of the two plate bodies 120), of the outer peripheral surface 131a of the first side portion 131 and the outer peripheral surface 132a of the second side portion 132 are chamfered. Consequently, it is possible to reduce the possibility that the cushioning member 130 enters in a clearance between (caught between) the side surface of the support member 11 and the side surfaces of the plate bodies 120 when the outer peripheral surface 131a of the first side portion 131 of the cushioning member 130, or the outer peripheral surface 132a of the second side portion 132 of the cushioning member 130, and the support member 11 abut (collide) against each other along with swing of the mass body 12. As a result, it is possible to suppress application of a large force to a part of the cushioning member 130, and to suppress degradation of and damage to the cushioning member 130.

In the centrifugal-pendulum vibration absorbing device 10 according to the embodiment, in addition, the end surface 122, in the circumferential direction, of each of the plate bodies 120 and the outer peripheral surface 121c of the attachment portion 121, which is provided on the center side with respect to the end surface 122, are formed to be continuous with each other through the inclined surface 123. Thus, in each of the mass bodies 12, a space is formed between the inclined surfaces 123 of the two plate bodies 120 and both side surfaces of the third side portion 133 of the cushioning member 130 (both end surfaces in the coupling direction of the two plate bodies 120) on the side of the end surfaces 122, in the circumferential direction, with respect to the attachment portion 121. Consequently, the third side portion 133 is deformed along the inclined surfaces 123 to enter in the space when the respective cushioning members 130 of the mass bodies 12 which are adjacent to each other in the circumferential direction abut (collide) against each other along with swing of the mass body 12. This makes it possible to reduce the possibility that the cushioning member 130 is caught between the end surface 122, in the circumferential direction, of the mass body (two plate bodies 120), to which the cushioning member 130 is attached, and the end surfaces 122, in the circumferential direction, of the adjacent mass body 12 (plate bodies 120) in the circumferential direction. As a result, it is possible to suppress application of a large force to a part of the cushioning member 130, and to suppress degradation of and damage to the cushioning member 130.

In the centrifugal-pendulum vibration absorbing device 10 according to the embodiment, further, the cushioning member 130 is formed such that the thickness D1 of the first side portion 131, the thickness D2 of the second side portion 132, the thickness D3 of the third side portion 133, and the thickness D4 of the fourth side portion 134 meet "D1>D2>D3>D4". Consequently, a force applied to the cushioning member 130 can be sufficiently reduced (absorbed), and the amount of a material used to form the cushioning member 130 can be reduced.

In the centrifugal-pendulum vibration absorbing device 10 according to the embodiment, additionally, the cushioning member 130 includes the first side portion 131 which abuts against the end surface 113, in the circumferential direction, of the large-diameter portion 112 of the support member 11 along with swing of the mass body 12, and is formed such that the end surface 113 of the large-diameter portion 112 of the support member 11 and the outer peripheral surface 131a of the first side portion 131 of the cushioning member 130 have an equal radius of curvature. Consequently, the area of contact between the first side portion 131 of the cushioning member 130 and the large-diameter portion 112 of the support member 11 at the time when the first side portion 131 abuts (collides) against the large-diameter portion 112 along with swing of the mass body 12 can be increased. As a result, a shock of the abutment (collision) can be reduced (absorbed better), and a load applied to the first side portion 131 of the cushioning member 130 at the time of the abutment can be reduced to improve the durability of the cushioning member 130.

In the centrifugal-pendulum vibration absorbing device 10 according to the embodiment, in addition, the cushioning member 130 which is constituted as a frame body is attached to the attachment portion 121 which is formed of the projecting portions 121j of the two plate bodies 120, the inner peripheral surfaces 131b to 134b of the first side portion 131 to the fourth side portion 134 of the cushioning member 130 matching the outer peripheral surfaces 121a to 121d, respectively, of the attachment portion 121, and the outer peripheral surface 131a of the first side portion 131 and the outer peripheral surface 121a of the attachment portion 121 (a surface that contacts the inner peripheral surface 131b of the first side portion 131) are formed to have an equal radius of curvature. Consequently, the attachment portion 121 can be increased in size while securing the thickness D1 of the first side portion 131.

In the centrifugal-pendulum vibration absorbing device 10 according to the embodiment, in addition, each of the mass bodies 12 is supported by the support member 11 so as to be turnable about the pendulum fulcrum and rotatable about the center of gravity. Consequently, vibration to be transmitted to the support member 11 can be damped utilizing not only swing about the pendulum fulcrum but also a rotation moment of the mass body 20 about the center of gravity.

In the centrifugal-pendulum vibration absorbing device 10 according to the embodiment, the cushioning member 130 is constituted as a frame body, and the peripheral edges, on both sides in the width direction, of the outer peripheral surfaces 131a to 134a and the inner peripheral surfaces 134b to 134b of the cushioning member 130 are chamfered over the entire periphery. However, the peripheral edges, on both sides in the width direction, of the inner peripheral surfaces 134b to 134b of the cushioning member 130 may not be chamfered over the entire periphery, or the peripheral edges, on both sides in the width direction, of the outer peripheral surface 133a of the third side portion 133 and the outer peripheral surface 134a of the fourth side portion 134 of the cushioning member 130 may not be chamfered.

Figure 13:
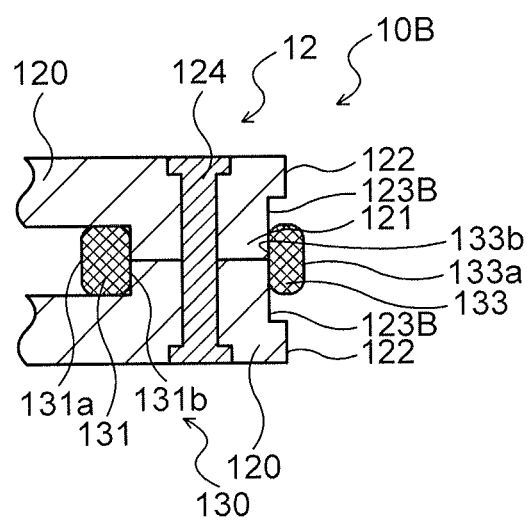
FIG. 13 illustrates a schematic configuration of a centrifugal-pendulum vibration absorbing device 10B according to a modification.

In the centrifugal-pendulum vibration absorbing device 10 according to the embodiment, the end surface 122, in the circumferential direction, of each of the plate bodies 120 and the outer peripheral surface 121c of the attachment portion 121, which is provided on the center side with respect to the end surface 122, are formed to be continuous with each other through the inclined surface 123. Thus, in each of the mass bodies 12, a space is formed between the inclined surfaces 123 of the two plate bodies 120 and both side surfaces of the third side portion 133 of the cushioning member 130 (both end surfaces in the coupling direction of the two plate bodies 120) on the side of the end surfaces 122, in the circumferential direction, with respect to the attachment portion 121. As illustrated in relation to a modification in FIG. 13, however, a recessed portion 123B may be formed on the inside surface of each of the plate bodies 120 (on the side of the other plate body 120) and on the side of the end surfaces 122 with respect to the attachment portion 121. Thus, in each of the mass bodies 12, a space may be formed between the inside surfaces of the two plate bodies 120 and both side surfaces of the third side portion 133 of the cushioning member 130 on the side of the end surfaces 122, in the circumferential direction, with respect to the attachment portion 121.

In the centrifugal-pendulum vibration absorbing device 10 according to the embodiment, in each of the mass bodies 12, a space is formed between the inclined surfaces 123 of the two plate bodies 120 and both side surfaces of the third side portion 133 of the cushioning member 130 on the side of the end surfaces 122, in the circumferential direction, with respect to the attachment portion 121. However, a space may not be formed between the inside surfaces of the plate bodies 120 (on the side of the other plate body 120) and both side surfaces of the third side portion 133 of the cushioning member 130 (both end surfaces in the coupling direction of the two plate bodies 120).

In the centrifugal-pendulum vibration absorbing device 10 according to the embodiment, the cushioning member 130 is formed such that the thickness D3 of the third side portion 133 is smaller than the thickness D1 of the first side portion 131 and the thickness D2 of the second side portion 132. However, the cushioning member 130 may be formed such that the thickness D3 of the third side portion 133 is generally equal to the thickness D1 of the first side portion 131 and the thickness D2 of the second side portion 132.

In the centrifugal-pendulum vibration absorbing device 10 according to the embodiment, the cushioning member 130 is formed such that the thickness D2 of the second side portion 132 is smaller than the thickness D1 of the first side portion 131. However, the cushioning member 130 may be formed such that the thickness D2 of the second side portion 132 is generally equal to the thickness D1 of the first side portion 131.

In the centrifugal-pendulum vibration absorbing device 10 according to the embodiment, the end surface 113, in the circumferential direction, of the large-diameter portion 112 of the support member 11 and the outer peripheral surface 131a of the first side portion 131 of the cushioning member 130 are formed to have an equal radius of curvature. However, the end surface 113 and the outer peripheral surface 131a may not be formed to have an equal radius of curvature.

In the centrifugal-pendulum vibration absorbing device 10 according to the embodiment, the outer peripheral surface 131a of the first side portion 131 of the cushioning member 130 and the outer peripheral surface 121a of the attachment portion 121 of the mass body 12 (a surface that contacts the inner peripheral surface 131b of the first side portion 131) are formed to have an equal radius of curvature. However, the outer peripheral surface 131a and the outer peripheral surface 121a may not be formed to have an equal radius of curvature. For example, a cushioning member may be attached to an attachment portion formed in a circular shape in section as seen in the axial direction of the support member 11, the cushioning member being provided with a through hole that matches the outer periphery of the attachment portion.

In the centrifugal-pendulum vibration absorbing device 10 according to the embodiment, the outer peripheral surface 132a of the second side portion 132 of the cushioning member 130 is formed as a flat surface. However, the outer peripheral surface 132a may be formed in a shape other than a flat surface, such as an arcuate shape in section in which the center portion in the longitudinal direction is convex toward the outer side in the radial direction with respect to both end portions.

In the centrifugal-pendulum vibration absorbing device 10 according to the embodiment, the cushioning member 130 is formed such that the angle between the second side portion 132 and the third side portion 133 is a right angle. However, the angle between the second side portion 132 and the third side portion 133 may be an acute angle or an obtuse angle.

In the centrifugal-pendulum vibration absorbing device 10 according to the embodiment, the cushioning member 130 is attached between the two plate bodies 120 and at both end portions, in the circumferential direction, of the two plate bodies 120. In the case where the mass bodies 12 which are adjacent to each other in the circumferential direction do not abut (collide) against each other, however, the cushioning member 130 may be attached at a position other than both end portions, in the circumferential direction, of the two plate bodies 120 and at which the cushioning member 130 abuts against the support member 11. Also in this case, as in the embodiment, the peripheral edges, on both sides in the width direction (the coupling direction of the two plate bodies 120), of the outer peripheral surfaces 131a and 132a of the first and second side portions 131 and 132, respectively, of the cushioning member 130, which abut against the support member 11 along with swing of the mass body 12, are chamfered. Thus, it is possible to reduce the possibility that the cushioning member 130 enters in a clearance between (caught between) the side surface of the support member 11 and the side surfaces of the plate bodies 120 when the outer peripheral surfaces 131a and 132a of the first and second side portions 131 and 132, respectively, of the cushioning member 130 and the support member 11 abut (collide) against each other along with swing of the mass body 12.

In the centrifugal-pendulum vibration absorbing device 10 according to the embodiment, the cushioning member 130 is attached so as not to be rotatable with respect to the mass body 12 (two plate bodies 120). However, the cushioning member 130 may be attached so as to be rotatable with respect to the mass body 12. In this case, a portion of the cushioning member 130 that abuts against the support member 11 along with swing of the mass body 12 is not determined. Therefore, at least the peripheral edges, on both sides in the width direction, of the outer peripheral surfaces of the cushioning member 130 are chamfered over the entire periphery.

In the centrifugal-pendulum vibration absorbing device 10 according to the embodiment, each of the mass bodies 12 is supported by the support member 11 so as to be turnable about the pendulum fulcrum and rotatable about the center of gravity. However, each of the mass bodies 12 may be supported by the support member 11 so as to be turnable about the pendulum fulcrum but not to be rotatable about the center of gravity.

In the centrifugal-pendulum vibration absorbing device 10 according to the embodiment, the attachment portion 121 for attachment of the cushioning member 130 is constituted with the projecting portion 121j projecting from each of the plate bodies 120. However, the attachment portion 121 may be constituted with a projecting portion projecting from only one of the plate bodies 120 to abut against (or without abutting against) the other plate body 120.

The correspondence between the main elements of the embodiment and the main elements of the disclosure described in the "SUMMARY" section will be described. In the embodiment, the support member 11 corresponds to the "support member". The plurality of mass bodies 12 correspond to the "plurality of mass bodies". The cushioning member 130 corresponds to the "cushioning member".

The correspondence between the main elements of the embodiment and the main elements of the disclosure described in the "SUMMARY" section does not limit the elements of the disclosure described in the "SUMMARY" section, because such correspondence is an example given for the purpose of specifically describing the disclosure described in the "SUMMARY" section. That is, the disclosure described in the "SUMMARY" section should be construed on the basis of the description in that section, and the embodiment is merely a specific example of the disclosure described in the "SUMMARY" section.

While a mode for carrying out the present disclosure has been described above by way of an embodiment, it is a matter of course that the present disclosure is not limited to the embodiment in any way, and that the present disclosure may be implemented in various forms.

A modification of the present disclosure provides a centrifugal-pendulum vibration absorbing device including: a support member coaxially attached to a rotary element; and a plurality of mass bodies each swingably supported by the support member and disposed adjacent to each other in a circumferential direction, in which: the support member includes a small-diameter portion and a plurality of large-diameter portions that project radially outward with respect to the small-diameter portion; the mass bodies each include two plate bodies coupled to face each other via the support member, and are swingably supported by the respective large-diameter portions of the support member; a cushioning member is attached between the two plate bodies and at both end portions in the circumferential direction so as not to be rotatable with respect to the two plate bodies; the cushioning member includes a first abutment portion that abuts against an end surface, in the circumferential direction, of the large-diameter portion along with swing of the mass body; and the end surface, in the circumferential direction, of the large-diameter portion and a surface of abutment of the first abutment portion with the large-diameter portion are formed to have an equal radius of curvature.

In the centrifugal-pendulum vibration absorbing device according to the modification of the present disclosure, the cushioning member is attached between the two plate bodies of the mass body and at both end portions in the circumferential direction (on the outer peripheral side (radially outer side) of the small-diameter portion of the support member) so as not to be rotatable with respect to the two plate bodies; the cushioning member includes the first abutment portion which abuts against the end surface, in the circumferential direction, of the large-diameter portion of the support member along with swing of the mass body; and the end surface, in the circumferential direction, of the large-diameter portion and the surface of abutment of the first abutment portion with the large-diameter portion are formed to have an equal radius of curvature. Consequently, the area of contact between the first abutment portion of the cushioning member and the end surface, in the circumferential direction, of the large-diameter portion of the support member at the time when the first abutment portion abuts (collides) against the end surface along with swing of the mass body can be increased. As a result, a shock due to the abutment (collision) can be reduced. In addition, a load applied to the cushioning member at the time of the abutment can be reduced to improve the durability of the cushioning member.

In the thus configured centrifugal-pendulum vibration absorbing device according to the modification of the present disclosure, the end surface, in the circumferential direction, of the large-diameter portion may be formed as a curved surface that is convex toward the outer side in the circumferential direction.

In the centrifugal-pendulum vibration absorbing device according to the modification of the present disclosure, in addition, at least one of the two plate bodies may be provided with a projecting portion that projects in the coupling direction of the two plate bodies; and the cushioning member may be constituted as a frame body, an inner periphery of which matches an outer periphery of the projecting portion, and attached to the projecting portion. In the centrifugal-pendulum vibration absorbing device of the embodiment according to the modification of the present disclosure, the surface of abutment of the first abutment portion with the large-diameter portion and a surface of contact of the projecting portion with an inner peripheral surface of the first abutment portion may be formed to have an equal radius of curvature. Consequently, the projecting portion can be increased in size while securing the thickness of the first abutment portion. In the centrifugal-pendulum vibration absorbing device according to the modification of the present disclosure, in addition, the cushioning member may be constituted as a polygonal frame body.

In the centrifugal-pendulum vibration absorbing device according to the modification of the present disclosure, further, the cushioning member may include a second abutment portion that abuts against an outer peripheral surface of the small-diameter portion along with swing of the mass body; and a surface of abutment of the second abutment portion with the small-diameter portion may be formed as a flat surface.

In the centrifugal-pendulum vibration absorbing device of the embodiment according to the modification of the present disclosure in which the cushioning member includes the second abutment portion, the cushioning member may include a third abutment portion that abuts against a cushioning member attached to the adjacent mass body in the circumferential direction along with swing of the mass body, and may be formed such that an angle between the second abutment portion and the third abutment portion is a right angle. In the centrifugal-pendulum vibration absorbing device according to the modification of the present disclosure, the cushioning member may be formed such that a thickness of the third abutment portion is smaller than a thickness of the first abutment portion and a thickness of the second abutment portion. This allows a reduction in amount of a material used to form the cushioning member compared to a configuration in which the thickness of the third abutment portion is generally equal to the thickness of the first abutment portion and the thickness of the second abutment portion.

In the centrifugal-pendulum vibration absorbing device of the embodiment according to the modification of the present disclosure in which the cushioning member includes the second abutment portion, in addition, the cushioning member may be formed such that a thickness of the second abutment portion is smaller than a thickness of the first abutment portion. This allows a reduction in amount of a material used to form the cushioning member compared to a configuration in which the thickness of the second abutment portion is generally equal to the thickness of the first abutment portion.

In the centrifugal-pendulum vibration absorbing device according to the modification of the present disclosure, the mass body may be supported by the support member so as to be swingable about a pendulum fulcrum and rotatable about a center of gravity. This makes it possible to damp vibration to be transmitted to the support member utilizing not only rotation about the pendulum fulcrum but also a rotation moment of the mass body about the center of gravity. As a result, the vibration damping effect of the centrifugal-pendulum vibration absorbing device can be further improved.

INDUSTRIAL APPLICABILITY

The present subject matter is applicable to the centrifugal-pendulum vibration absorbing device manufacturing industry and so forth.

The invention claimed is:

1. A centrifugal-pendulum vibration absorbing device comprising:
  a support member attached to a rotary element; and
  a plurality of mass bodies each swingably supported by the support member and disposed adjacent to each other in a circumferential direction, wherein:
  the mass bodies each includes two plate bodies coupled to face each other via the support member;
  a cushioning member is attached between the two plate bodies so as not to rotate with respect to the two plate bodies; and
  the cushioning member includes a first abutment portion that abuts against the support member along with swing of each of the mass bodies, and
  wherein:
  at least one of the two plate bodies is provided with a projecting portion that projects in a coupling direction of the two plate bodies; and
  the cushioning member is constituted as a frame body, an inner periphery of which matches an outer periphery of the projecting portion, and attached to the projecting portion.

2. The centrifugal-pendulum vibration absorbing device according to claim 1, wherein
  the cushioning member is attached between the two plate bodies and at both end portions, in a circumferential direction, of the two plate bodies.

3. The centrifugal-pendulum vibration absorbing device according to claim 1, wherein:
  the projecting portion projects on an inner side with respect to end surfaces, in the circumferential direction, of the plate bodies;
  the cushioning member includes a second abutment portion that abuts against a second cushioning member attached to one of the adjacent mass bodies in the circumferential direction along with swing of each of the mass bodies; and
  the two plate bodies are formed such that a space is formed on a side of the end surfaces, in the circumferential direction, with respect to the projecting portion and between surfaces that face each other and both end surfaces, in the coupling direction, of the cushioning member.

4. The centrifugal-pendulum vibration absorbing device according to claim 3, wherein
  the two plate bodies are formed such that the end surfaces, in the circumferential direction, of the two plate bodies and a surface of contact of the projecting portion with an inner peripheral surface of the second abutment portion are continuous with each other through an inclined surface.

5. The centrifugal-pendulum vibration absorbing device according to claim 4, wherein
  the cushioning member is formed such that thickness of the second abutment portion is smaller than thickness of the first abutment portion.

6. The centrifugal-pendulum vibration absorbing device according to claim 5, wherein
  the cushioning member is constituted as a polygonal frame body.

7. The centrifugal-pendulum vibration absorbing device according to claim 6, wherein:
  the support member includes a small-diameter portion and a large-diameter portion that projects radially outward with respect to the small-diameter portion and that swingably supports each of the mass bodies; and
  the first abutment portion of the cushioning member includes a large-diameter abutment portion that abuts against an end surface, in the circumferential direction, of the large-diameter portion along with swing of each of the mass bodies, and a small-diameter abutment portion that abuts against an outer peripheral surface of the small-diameter portion along with swing of each of the mass bodies.

8. The centrifugal-pendulum vibration absorbing device according to claim 7, wherein
  the cushioning member is formed such that thickness of the small-diameter abutment portion is smaller than thickness of the large-diameter abutment portion.

9. The centrifugal-pendulum vibration absorbing device according to claim 8, wherein
  each of the mass bodies is supported by the support member so as to swing about a pendulum fulcrum and rotate.

10. The centrifugal-pendulum vibration absorbing device according to claim 2, wherein:
  the projecting portion projects on an inner side with respect to end surfaces, in the circumferential direction, of the plate bodies;
  the cushioning member includes a second abutment portion that abuts against a second cushioning member attached to one of the adjacent mass bodies in the circumferential direction along with swing of each of the mass bodies; and
  the two plate bodies are formed such that a space is formed on a side of the end surfaces, in the circumferential direction, with respect to the projecting portion and between surfaces that face each other and both end surfaces, in the coupling direction, of the cushioning member.

11. The centrifugal-pendulum vibration absorbing device according to claim 10, wherein
  the two plate bodies are formed such that the end surfaces, in the circumferential direction, of the two plate bodies and a surface of contact of the projecting portion with an inner peripheral surface of the second abutment portion are continuous with each other through an inclined surface.

12. The centrifugal-pendulum vibration absorbing device according to claim 10, wherein
the cushioning member is formed such that thickness of the second abutment portion is smaller than thickness of the first abutment portion.

13. The centrifugal-pendulum vibration absorbing device according to claim 2, wherein
the cushioning member is constituted as a polygonal frame body.

14. The centrifugal-pendulum vibration absorbing device according to claim 2, wherein:
the support member includes a small-diameter portion and a large-diameter portion that projects radially outward with respect to the small-diameter portion and that swingably supports each of the mass bodies; and
the first abutment portion of the cushioning member includes a large-diameter abutment portion that abuts against an end surface, in the circumferential direction, of the large-diameter portion along with swing of each of the mass bodies, and a small-diameter abutment portion that abuts against an outer peripheral surface of the small-diameter portion along with swing of each of the mass bodies.

15. The centrifugal-pendulum vibration absorbing device according to claim 14, wherein
the cushioning member is formed such that thickness of the small-diameter abutment portion is smaller than thickness of the large-diameter abutment portion.

16. The centrifugal-pendulum vibration absorbing device according to claim 2, wherein
each of the mass bodies is supported by the support member so as to swing about a pendulum fulcrum and rotate.

17. The centrifugal-pendulum vibration absorbing device according to claim 1, wherein the projecting portion is formed integrally with the at least one of the two plate bodies.

18. The centrifugal-pendulum vibration absorbing device according to claim 1, wherein the two plate bodies and the projecting portion are attached to one another using a fastening member.

19. The centrifugal-pendulum vibration absorbing device according to claim 1, wherein the projecting portion is formed of the same material as the at least one of the two plate bodies.

20. The centrifugal-pendulum vibration absorbing device according to claim 1, wherein the inner and outer peripheral edges of the first abutment portion of the cushioning member are chamfered.

* * * * *